United States Patent [19]
Nestler et al.

[11] Patent Number: 6,042,965
[45] Date of Patent: *Mar. 28, 2000

[54] UNITARY SEPARATOR AND ELECTRODE STRUCTURE AND METHOD OF MANUFACTURING SEPARATOR

[75] Inventors: Joseph P. Nestler, Verona; Daniel A. Schneider; Shirley A. Craanen, both of Madison; Timothy J. Stachoviak, Waunakee, all of Wis.

[73] Assignee: Johnson Research & Development Company, Inc., Smyrna, Ga.

[ * ] Notice: This patent is subject to a terminal disclaimer.

[21] Appl. No.: 08/989,803

[22] Filed: Dec. 12, 1997

[51] Int. Cl.⁷ ............................ H01M 2/14; H01M 4/02
[52] U.S. Cl. .................... 429/129; 429/131; 429/137; 429/209; 429/217; 429/246; 429/247; 429/249; 29/623.5
[58] Field of Search ..................... 429/247, 249, 429/253, 254, 142, 129, 131, 132, 133, 136, 137, 162, 209, 246, 217; 29/623.1, 623.5

[56] References Cited

U.S. PATENT DOCUMENTS

| | | | |
|---|---|---|---|
| 4,550,064 | 10/1985 | Yen et al. | 429/94 |
| 4,654,281 | 3/1987 | Anderman et al. | 429/209 |
| 4,994,335 | 2/1991 | Kamaei et al. | 429/254 |
| 5,219,680 | 6/1993 | Fauteux | 429/192 |
| 5,227,264 | 7/1993 | Duval et al. | 429/153 |
| 5,260,148 | 11/1993 | Idota | 429/198 |
| 5,336,573 | 8/1994 | Zuckerbrod et al. | 429/252 |
| 5,350,645 | 9/1994 | Lake et al. | 429/124 |
| 5,362,581 | 11/1994 | Chang et al. | 429/249 |
| 5,387,479 | 2/1995 | Koksbang | 429/126 |
| 5,426,006 | 6/1995 | Delnick et al. | 429/218 |
| 5,427,872 | 6/1995 | Shen et al. | 429/142 |
| 5,478,364 | 12/1995 | Mitate et al. | 29/623.5 |
| 5,478,673 | 12/1995 | Funatsu | 429/197 |
| 5,498,489 | 3/1996 | Dasgupta et al. | 424/152 |
| 5,512,389 | 4/1996 | Dasgupta et al. | 429/192 |
| 5,540,741 | 7/1996 | Gozdz et al. | 29/623.5 |
| 5,571,634 | 11/1996 | Gozdz et al. | 429/192 |
| 5,607,485 | 3/1997 | Gozdz et al. | 29/623.5 |
| 5,677,083 | 10/1997 | Tomiyama | 429/194 |
| 5,686,201 | 11/1997 | Chu | 429/52 |
| 5,691,005 | 11/1997 | Morigaki et al. | 427/508 |
| 5,691,047 | 11/1997 | Kurauchi et al. | 428/315.7 |
| 5,702,845 | 12/1997 | Kawakami et al. | 429/224 |
| 5,705,292 | 1/1998 | Yukita et al. | 429/137 |
| 5,714,277 | 2/1998 | Kawakami | 429/62 |
| 5,731,104 | 3/1998 | Ventura et al. | 429/188 |

*Primary Examiner*—Stephen Kalafut
*Assistant Examiner*—Jonathan Crepeau
*Attorney, Agent, or Firm*—Kennedy, Davis & Hodge, LLP

[57] ABSTRACT

A secondary battery separator comprises a fibrous core embedded in a polymeric sheet having improved electrode fusion thereto in unitary construction. In the process of manufacturing the separator, a fibrous, polymeric, substantially two-sided core matrix is coated with a polymer mixture containing a plasticizer and a solvent vehicle, and a vacuum is applied to the reverse side from the coated side to cause the polymer mixture to penetrate and infuse the capillary voids of the core matrix from the opposite coated side. The vacuum is continued until the solvent vehicle is fully volatilized. After the solvent vehicle has dissipated, the fiber matrix is turned over, and the process is repeated by applying a coating of polymer mixture to the second side and pulling a vacuum on the opposite side to cause penetration of the matrix.

5 Claims, 9 Drawing Sheets

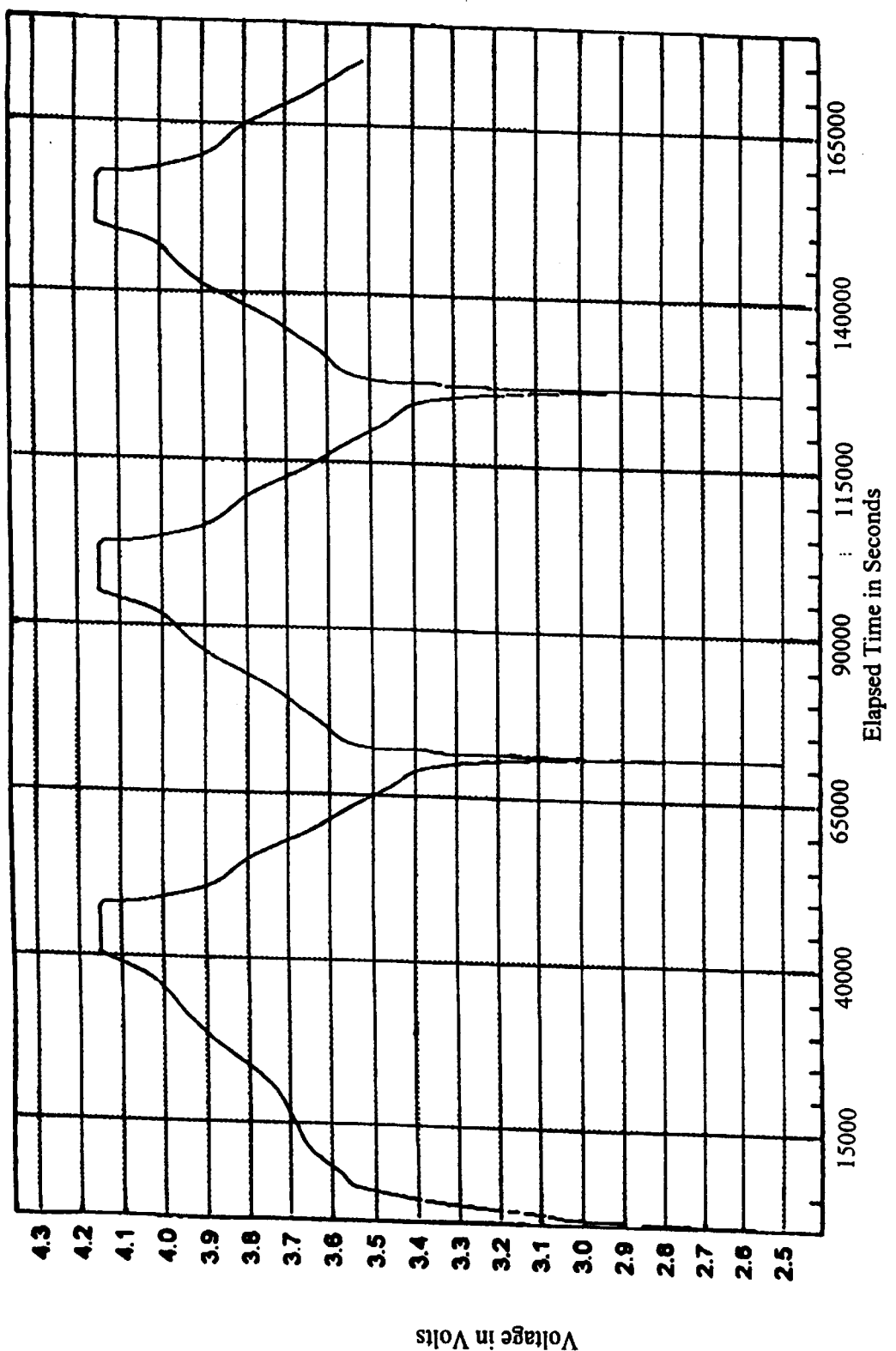

UNITARY SEPARATOR AND ELECTRODE STRUCTURE AND METHOD OF MANUFACTURING SEPARATOR

FIELD OF THE INVENTION

The present invention relates to rechargeable solid state lithium ion batteries, and more particularly to a separator component with improvements in function and manufacturability.

BACKGROUND OF THE INVENTION

In the construction of any battery, six elements must be present, namely, a positive and negative electrode, a housing, a separator, an electrolyte, and current collectors. The separator is an important element because it must be permeable to ions moving back and forth during charging and discharging, but must not permit flow of electrons directly from pole to pole, which shorts out the current, and prevents or limits electrons from flowing from anode to cathode through a circuit. In rechargeable lithium ion batteries, which are generally formed of very thin layers of the components, it is important that the distance between electrodes be as short as possible to permit efficient ion transfer, but not so short as to permit electron flow. Typically, separators have been constructed of very thin sheets of plastic, which are rendered porous.

In general, a nonaqueous environment is maintained, since lithium and its salts are notoriously reactive in aqueous solutions. Aprotic organic solvents such as propylene carbonate or ethylene carbonate are commonly used in which lithium salt solutes are readily dispersable. Other solvents are tetrahydrofuran, 1,2-dimethoxyethane, dimethyl carbonate, diethyl carbonate and diethoxyethane. For a discussion of conventional solvent/lithium solute systems, see S. Hossain, "Rechargeable Lithium Batteries (Ambient Temperature)", in *Handbook of Batteries and Fuel Cells*, D. Linden, Ed., McGraw-Hill, 2nd Ed., 1995. The plastic separator, of course, must be stable to the solvent selected.

U.S. Pat. Nos. 4,138,459, 3,801,404, and 3,843,761 disclose a method of producing a porous plastic separator by stretching a crystalline polyolefin film at a temperature below its transition temperature. Performance of such stretched polymers is impaired, however, because lack of control over uniform pore size leads to excessive distance between electrodes. U.S. Pat. No. 4,994,335 discloses a stretching process in which the strain rate and temperature of the process are tightly controlled, to produce microporosity in only one direction, so that fine fibrils are connected between adjacent unstretched planar flat portions in two dimensions.

A serious problem arises when the lithium ions react in the complete cell to form dendrites of lithium, which tend to short out the battery by filling the void spaces of the separator and creating a conductive pathway. U.S. Pat. No. 5,427,872 discloses a method of preventing dendrite shorting, by disposing an inert polypropylene or polyethylene composite separator along with a dendrite reactive fluorinated polymer such as polyfluoroethylene. Porosity is maintained by prevention of dendrite penetration of the electrode-protective second separator.

U.S. Pat. No. 5,290,644 discloses a separator made from a film composed of a cross-linked polymer such as polybutadione, etc. capable of swelling in the presence of electrolyte to create pressure against the electrodes. A woven or unwoven fabric which is capable of enhancing such swelling may optionally be incorporated into the film.

In an alternative approach, U.S. Pat. Nos. 5,460,904, 5,296,318, 5,429,891, 5,571,634, and 5,587,253 disclose a separator comprising a self-supporting film of a copolymer of vinylidene fluoride (PVdF) and hexafluoropropylene (HFP). Prior to casting, the copolymers are mixed with a medium to high temperature boiling plasticizer solvent such as dibutyl phthalate (DBP) and a filler such as $SiO_2$. In a preferred embodiment, the "dry" separator may be joined with the electrodes by lamination under heat and pressure prior to electrolyte loading. After lamination, the plasticizer is leached out (extracted) with a solvent such as ethylether, and replaced by cell electrolyte. The spaces occupied by the plasticizer are filled with electrolyte in a communicating network of vacuoles permitting ion diffusion.

U.S. Pat. No. 4,550,064 discloses a separator comprising two layers, the first inner layer composed of microporous polypropylene (CELGARD®) or fiberglass whose surfaces are made more hydrophilic by coating with imidazoline. These separators are to be used in combination with a positive electrode manufactured with a propylene/ethylene elastomer binder. U.S. Pat. Nos. 4,650,730, 4,731,304, and 5,240,655 disclose separators made from bonding two extruded layers of film together. Extractable fillers are included in the extruded film so that upon extraction, the separator has the requisite porosity to function in a battery. U.S. Pat. No. 5,565,281 is an improvement in bilayer separators, in that one of the two layers is selected for its strength. The purpose of the bilayer is to provide shutdown capability in the event of a short, while maintaining the strength to resist breaches of contact between the electrodes.

The foregoing separators have certain disadvantages. Multi-layer separators have a step gradient of porosity with different diffusion constants for electrolyte in each layer. Efficiency of ion transfer may be impaired which interferes with the discharge rate of the battery, and may adversely affect capacity. In the case of the separators made from PVdF and HFP, solvent leaching causes brittleness which leads to a significant level of product failure.

SUMMARY OF THE INVENTION

In accordance with the present invention, a separator suitable for use in a secondary lithium ion battery is made of a pre-formed porous woven or non-woven mat comprising a first homopolymer of polypropylene, polyethylene, polyvinylalcohol, and the like, impregnated with a second polymer to form a sheet of porous polymer containing the embedded woven or unwoven mat. Porosity of the polymeric sheet, which may preferably be polyvinylidene difluoride, is obtained by first mixing the polymer with a solvent selected from one or more non-aromatic aliphatic diesters and acetone, followed by forming a layer of the polymer diester mixture. The resultant separator, positionable between anode and cathode electrodes, comprises a porous core layer matrix, the layer having opposite surfaces, and at least one of the surfaces having a porous polymeric coating applied thereto. The plasticizer is removed by leaching, or by applying a vacuum. The separator construct is sufficiently permeable to electrolyte ions to minimally discharge a secondary battery having a carbonaceous or other lithium intercalation anode and a lithiated metal oxide cathode.

In use, the separator is a component of a rechargeable lithium ion battery comprising a housing, electrodes contained in the housing including a carbonaceous or other lithium intercalation anode consisting of amorphous graphite, coke, filamentous carbon, or combinations thereof, and a lithiated metal oxide cathode, an electrolyte solution in the housing, the electrolyte solution containing a lithium salt capable of ionizing in an organic solvent, the salt being dispersed in the organic solvent, current collectors electrically connected and disposed in contact with the electrodes, and the separator disposed between the electrodes, the separator comprising an ion permeable, porous elastic sheet made of a polymeric material and a sheet-like fiber matrix core defining a plurality of interstitial voids which are occupied by the polyermic material.

In a further aspect, the separator matrix core has a first surface adapted to face the anode and a second surface adapted to face the cathode, wherein the polymeric sheet provides a layer of polymeric material overlying the first surface of the matrix core and provides a layer of polymeric material overlying the second surface of the matrix core.

The separator may be manufactured on a flat surface so that, as a starting material, the fiber matrix core is substantially flat having a first surface and a second surface opposite the first surface and having a thickness extending between the first and second surfaces, the matrix core defining a plurality of interstitial voids extending through the thickness of the matrix core. After coating, the separator further comprises a unitary, ion permeable, porous elastic polymeric sheet having the matrix embedded therein, and the polymeric sheet occupying the interstitial voids of the matrix core.

The separator is assembled into a battery comprising a housing, and contained therein, a cathode, an anode, current collectors electrically communicating with the cathode and anode, a separator between the anode and the cathode, the separator including an ion permeable, porous elastic sheet made of polymeric materials having a first face facing the cathode and a second face facing the anode, and having a thickness extending between the first and second faces, and a sheet-like fiber matrix core embedded within the thickness of the sheet, the fiber matrix core having a plurality of interstitial voids which are occupied by the polymeric material of the porous sheet, and finally, adding a sufficient volume of electrolyte to the housing to imbibe the entire volume capacity of the cathode, anode, and separator.

In the process of manufacturing the separator, a fibrous, polymeric, substantially two-sided core matrix is coated with a polymer mixture containing a non-aromatic plasticizer and a solvent vehicle (such as acetone), and a vacuum is applied to the reverse side from the coated side to cause the polymer mixture to penetrate and infuse the capillary voids of the core matrix from the opposite coated side. The vacuum is continued until the solvent vehicle is fully volatilized.

After the solvent vehicle has dissipated, the fiber matrix is turned over, and the process is repeated by applying a coating of polymer mixture to the second side and pulling a vacuum on the opposite side to cause penetration of the matrix. Under these conditions, the boundaries of the advancing polymer mixture will merge to form a unitary polymeric sheet in which the matrix core is embedded. Sufficient excess polymer mixture is coated onto each side to leave an overlying thin layer of polymer on the face of each side, so that fusion with an electrode on each side of the separator is feasible. An overlay layer of 0.50 to 2.0 mils is sufficient for this purpose.

A rechargeable battery of simple unitary construction is produced by combining in alignment a carbonaceous or other lithium intercalation anode, a lithiated metal oxide cathode, and the separator, the separator being disposed between the carbonaceous or other lithium intercalation polymeric anode and lithiated metal oxide polymeric cathode, and fusing the anode, cathode, and separator into a unitary structure.

BRIEF DESCRIPTION OF THE DRAWINGS

FIGS. 3a and 3b are rectilinear plots showing the charge and discharge voltage profiles for a second lithium ion battery (a) and the corresponding capacity curves (b).

DESCRIPTION OF THE PREFERRED EMBODIMENT

Figure 1:
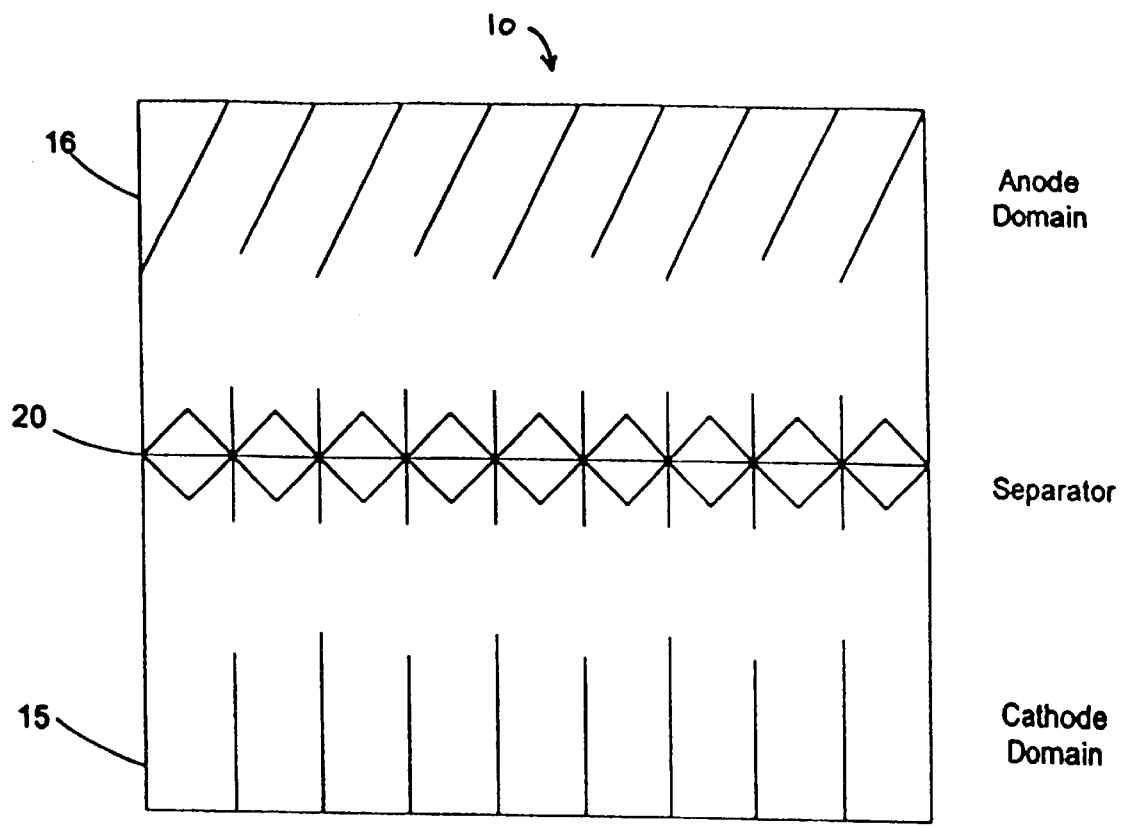
FIG. 1 is a schematic cross-sectional drawing of a typical plastic layered battery showing fusion of cathode and anode domains to the separator.

In solid state rechargeable lithium ion batteries, the separator is critical not only to the proper functioning of the battery, but also to its manufacturability. There are many manufacturing strategies known in the art for causing the anode, cathode, and separator elements to be juxtaposed, so that ions can flow freely back and forth between the electrodes in successive charging and discharging cycles. For example, the layers can be aligned and then wound into a tight coil, or may be compressed and restrained mechanically. Ideally, however, a stable laminate of highly elastic construction would permit a much larger range of use, and provide extreme flexibility in the types of housings that contain the battery components.

The separator of the present invention consists of two parts, an inner core matrix of a fibrous homopolymer, embedded in a sheet of porous elastic polymer. The core matrix is a fabric-like composite manufactured in preformed rolls by several vendors such as Web Dynamics and Hollingsworth/Vose. These materials are made of minute polymer fibers, finely comminuted into fibers about 0.1 micron in diameter to about 1.5 microns in length. Structurally the matrix fibers are deposited randomly to create very small pores throughout the fabric body. These matrices may be manufactured by deposition of fibers in the desired thickness onto a running conveyor track, and compressed under rollers into sheets in a process similar to paper manufacture. Alternatively, the fiber sheets may be melt blown. The resultant fiber matrix is preferably 0.75 to 5.0 mils in thickness and has a density of between 15 and 50 grams/sq. meter. Finer materials may be obtained by custom manufacture. Since it is desirable to reduce the ion path between electrodes to every extent, the custom materials will have a target thickness of less than 0.75 mils with a slight increase in density. It is only in the present process which permits complete saturation of the fiber vacuoles with polymer, that the thickness of the fibrous core and the overall separator can be reduced to 1.75 to 3.00 mils overall without strength failure.

The homopolymers of the separator fibers are selected from polyethylene, polypropylene, polyvinylalcohol, and the like, manufactured by conventional methods. The fibers are made up of semi-randomly disposed strands of high molecular weight polymer. Combinations of homopolymers may theoretically be employed. The homopolymers, being readily commercially available pre-formed in sheets, have a very low unit cost, and are manufactured according to specifications giving good reproducibility in battery applications. The fiber matrix provides strength and resilience, which may account for its resistance to fracture.

The selection of the elastic polymer is largely dependent upon the composition of the core matrix material. In the situations in which polyethylene or polypropylene fiber is used, a polymeric infusion of polyvinylidene difluoride is preferred. For a polyvinylalcohol core, a water compatible interpositional material such as KYNAR® Latex milk (Elf-Atochem) or a TEFLON® dispersion such as Dupont T-30 is preferred. The fundamental requirement is that the elastic plastic sheet formed after vacuum diffusion be porous, or be capable of being rendered porous, to permit ion transport. Typically, the polymer, which is a powder, is dispersed in an organic solvent such as acetone. A plasticizer is added, the viscosity is adjusted by curing at room temperature or slightly elevated temperatures at 40°–60° C., and the mixture is applied to the fibrous core, as follows:

The fibrous core is placed on a vacuum table and vacuum is applied to the core side face down on the table. A laterally moving casting block is filled with the polymeric mixture and applied to the upper surface by spreading at the desired thickness. The vacuum continues to be applied until all of the solvent has been drawn off. The vacuum is released, the fibrous core fabric is inverted so that the vacuum side is now exposed, and the vacuum process is repeated with the casting block. Multiple thin coatings may be applied, and result in a smoother, more uniform coating.

In this process, the polymeric mixture is pulled by the vacuum into the fibrous core matrix, completely filling the interstitial void spaces. The proportion of solvent is large enough (greater than 20 percent by volume), so that when the polymer fronts advancing through the fibrous core meet and overlap, the residual solvent reliquifies the surrounding polymer, and when dried of the solvent forms a continuous, unitary plastic sheet in which the fibrous core matrix is embedded. There are no true layers of polymer on the fibrous matrix, the interfaces between the advancing polymer boundaries having merged to lose completely any independent identity. The resulting structure is very pliant, translucent, and smooth, but extraordinarily strong, as shown in the Examples.

The overall thickness of the separator is important because it defines the path length from one electrode to the other. As pointed out above, custom manufacture can reduce the thickness of the matrix. The thickness of polymer remaining on the separator surfaces should be a minimum of about 0.5 mils. Joining of the electrodes, particularly in a unitary, continuous composite construction, requires about 1.0 mil. In any event, it appears that a more uniform coating is achieved when an excess of polymeric mixture is run onto the matrix surface for distribution by the casting block.

The vacuum table is a flat manifold having a large plurality of holes approximately 1.0 to 5.0 mm in diameter. A fine mesh screen (200×200 mesh) is placed over the manifold to prevent the matrix from being pulled into the holes. A typical vacuum assembly for laboratory scale utilizes a Variac in combination with a vacuum pump fitted with a 1–6 hp motor. An adequate amount of polymeric mixture is achieved when the interstitial spaces of the fiber matrix are saturated with polymeric mixture. Saturation has occurred when the void spaces of the base fibrous matrix are filled.

On an industrial scale, it may be impractical to apply polymeric mixture to a single flat sheet at a time. The present method is adaptable to preparation of an entire roll of fabric stock by passing the stock through a coating bar, and then infusing the polymeric mixture into the matrix by passing over a vacuum drum, first on one side and then coating again and passing the reverse side over a second vacuum drum. For multiple coatings, a corresponding plurality of drums may be employed.

The plasticizers of the present invention are non-aromatic, aliphatic diesters of the general formula $R_1OOC(CH_2)_n COOR_2$ wherein $R_1$ and $R_2$ are methyl-, ethyl-, propyl-, butyl-, or combinations thereof, and n is 1 to about 7. The plasticizer must be capable of uniform micro-dispersion throughout the polymer sheet, so that upon removal a network of microscopic pores renders the entire structure ion permeable. Optionally, lithium salts contained in the electrolyte solution may be included in the polymer, plasticizer, solvent mixture, so that upon removal of the plasticizer in the polymer coating, a uniform dispersal of lithium salts is obtained in situ.

Application of coating may be effected by any conventional method including spreading or casting with a doctor blade, rolling, or controlled spraying. The ratio of ingredients in the coating mixture will affect the porosity and adhesive properties of the coated structure. The ratio of polymer to plasticizer should preferably be on the order of 2:1 to 1:10, and the ratio of polymer/plasticizer to solvent may be between about 1:5 to 2:1 for best results. Ratios are expressed as w/w. Fillers such as $TiO_2$ or $SiO_2$ appear to be unnecessary to provide material strength.

The secondary battery components that can be used with the separator of the present invention are conventional electrode, electrolyte, and current collector systems known in the solid state (dry) lithium ion field of battery technology using plastic electrode and separator materials. In the electrolyte solutions, typical lithium salts include $LiPF_6$, $LiASF_6$, $LiBF_4$, $LiClO_4$, $LiN(CF_3SO_2)_3$, and $LiN(SO_2C_2F_5)_3$. Typical solvent systems for dispersion of the lithium ion salt include diethyl, ethyl, propyl or dimethyl carbonate or mixtures thereof, tetrahydrofuran, 1,2-dimethoxyethane, and other organic solvents in which lithium salts can ionize. In general, solvents of low viscosity are preferred (<0.5 cP at 25 degrees C.), to facilitate ion migration and diffusion. Water adsorption characteristics are important, since lithium and its salts are highly unstable in aqueous environments. Suitable solvents must have a water content of less than 10 ppm.

Electrodes in solid state lithium ion batteries are fabricated from lithium compounds dispersed in thin-layer porous polymeric sheets. Any electrochemically compatible cathode and anode elements may utilize the present separator in a battery configuration. Typically in a solid state lithium ion battery, the cathode is a dispersed lithiated metal oxide with or without a binder. Examples include LiMO where MO is a Co, Ni, Mn, or V metal oxide of appropriate valence. Conventional methods of manufacturing cathodes suitable for use with the present separator are disclosed in U.S. Pat. Nos. 5,296,318, 4,550,064, 5,260,148, 5,518,842 and 5,380,606, hereby incorporated by reference.

Anodes in solid state lithium ion batteries are typically carbonaceous, comprised of various forms of synthetic or natural graphite, or petroleum coke, or doped coke. Lithium ions are often intercalated into the carbonaceous material to yield a $LiC_6$ stoichiometry. U.S. Pat. No. 5,219,680 discloses a method for making such an electrode by entrapping amorphous carbon in a polymeric premix followed by in situ polymerization around a metallic collector element. U.S. Pat. No. 5,514,490 discloses an unusual anode utilizing a layered titanium phosphate followed by intercalation of Li. A further type useful with the present separator is a non-crystalline carbon having low density, and a particular Raman spectrum, as disclosed in U.S. Pat. No. 5,401,598. A preferred carbonaceous or other lithium intercalation anode material is compacted graphite dispersed in a porous polymeric matrix. The foregoing patents are hereby incorporated by reference. Further cathode and anode materials are described in detail in Hossain, supra.

In a preferred method, the electrodes may be disposed directly onto the surface of the separator as a slurry. The slurry will contain a relatively high percentage of solvent (about 45 to 60 percent by wt.), and residence time of the layered liquefied plastic is increased by controlled drying in a solvent vapor atmosphere. The effect of these improvements is to merge the boundaries of separator and electrode, thereby creating a seamless unitary structure but having distinct separator, anode, and cathode domains.

The collector elements useful in the present battery are conventional metals such as copper and aluminum. Preferred collectors are typically perforated or expanded metals with a plurality of minute holes.

FIG. 1 shows a secondary battery design incorporating the separator of the present invention. A secondary battery subassembly 10 has cathode domain 15 and an anode domain 16 merged to a separator 20 disposed there between, thereby preventing shorting out of the battery. The figure does not contain a line of demarcation between separator and the electrodes, to emphasize the merger of boundaries between separator and electrode. The horizontal and diagonal lines represent the respective anode and cathode active ingredients which are segregated into their respective domains but are not present in distinct layers. Typically, many layers can be stacked with multiple anode or cathode elements interfacing without interposing a separator.

The present secondary battery structure may be manufactured with components having a wide variety of shapes and sizes. Since the composite remains highly flexible, the battery components can be embedded within the very structure of the object to be powered. Because of the capability for a large number of recharging cycles, the lifetime of the battery may often be longer than that of the powered article itself.

In actual construction, short metallic tabs may extend beyond the ends of the current collector to provide connecting points for the circuit linkage. The common electrodes may be interconnected by conventional circuit means. Further advantages of the present invention will be apparent from the Examples which follow.

EXAMPLE 1

A separator according to the method of the invention was made as follows: a base non-woven polyethylene fiber sheet (Web Dynamics, PX0074) was purchased from the vendor. The manufacturer's specifications of the material include a thickness dimension of 2.5 mils and a pore size not to exceed 0.1 mm. The product is manufactured having a rough (non-calendered) surface on one side and a smooth (calendered) surface on the other side. The density of the material was empirically determined as 28 $g/m^2$.

The polymer coating step was carried out on approximately 25 inch long by 6 inch wide sections of the fiber sheets. A coating mixture was prepared containing 19 g KYNAR® 2801 (range 5–30%) brand polyvinylidene difluoride copolymer, 33 g (range 10–35%) dibutyl adipate (as a plasticizer), and 135 ml (balance) of reagent grade acetone. The copolymer and the acetone were measured into a sealed container, shaken for approximately five minutes, then allowed to stand for one hour to dissolve the copolymer. The plasticizer was then added, the container resealed and shaken for approximately one minute, then allowed to stand for fifteen minutes to equilibrate.

Figure 6:
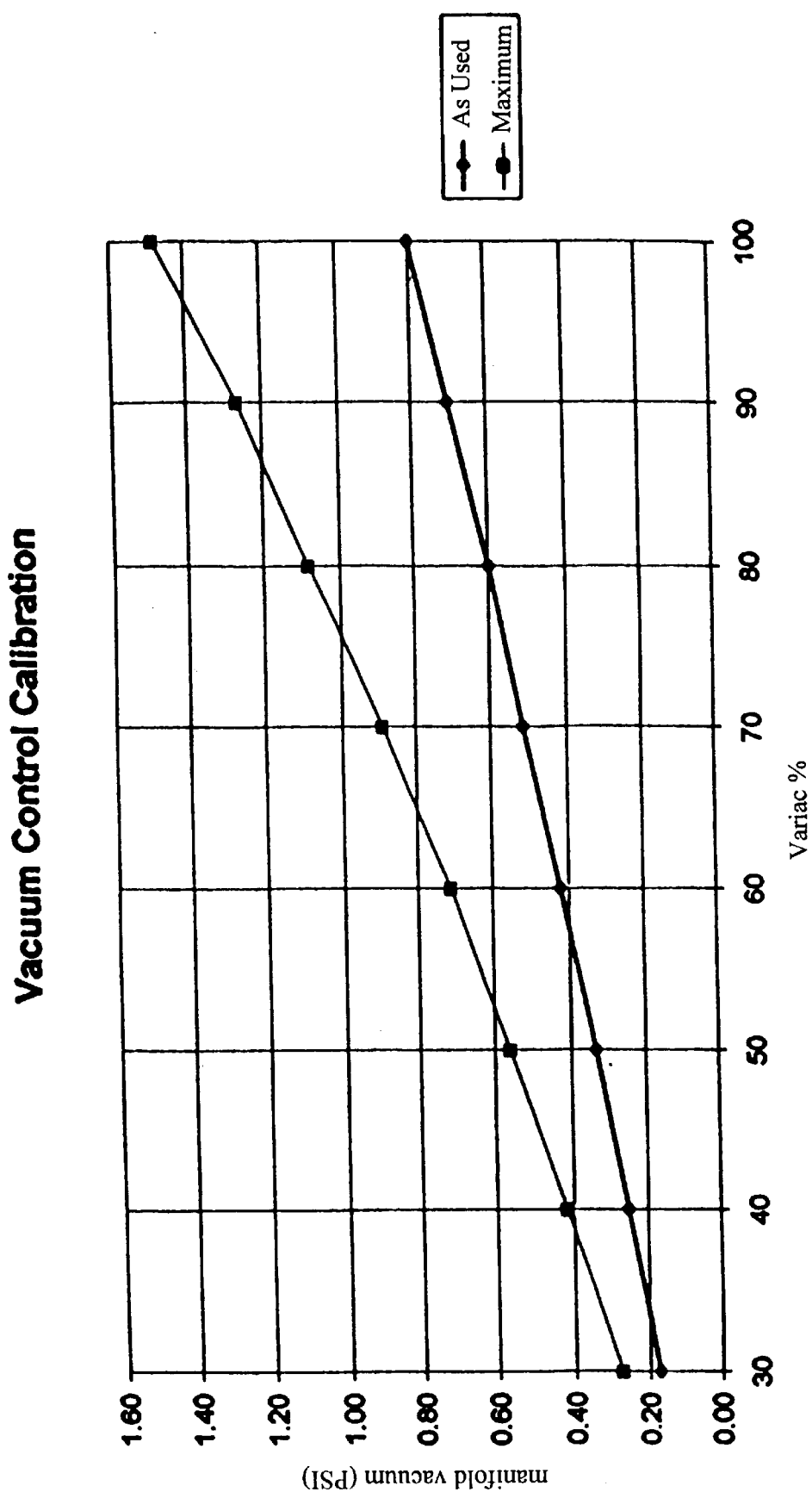
FIG. 6 is a graph showing the relation of Variac setting to corresponding vacuum units. The Variac controls voltage to the vacuum unit.

A sheet of backing paper approximately 0.004" thick was placed on top of a fine mesh screen, having a 200×200 mesh configuration which was positioned on top of the vacuum plate having 51×23 ⅛th inch holes bored through to a common vacuum manifold. The section of fiber sheet was then placed on a vacuum table with the rough side facing down onto the backing paper. An excess of coating mixture (approximately 10 ml) was spread onto the vacuumized fiber sheet and distributed smoothly over the surface with a casting block having a six mil gap. After vacuum drying the sheet was reversed, and coating mixture was applied through an eight mil gap to the rough side. After drying the sheet was again reversed, and coating mixture was applied through a three mil gap to the original, first or smooth side over the previous coating layer. Finally, after drying, the sheet was again reversed, and coating mixture was applied through a three mil gap to the second or rough side over the previous coating layer. Coated weight was approximately 105 $g/m^2$, with a base thickness of 2.5 mil and a coated thickness of about 4.5 mil. Table 4 shows the relation of Variac setting to the vacuum values generated in either pounds per square inch or millimeters of mercury. These values are plotted in FIG. 6.

The separator so produced was incorporated into a solid state lithium ion battery as follows: the cathode comprised 65 percent $LiNiO_2$ (FMC) dispersed in a matrix of substantially similar composition to the copolymeric coating of the separator. The plastic electrode also contained 5.5 percent carbon black (Super-P brand) to improve conductivity. A slurry of the cathode material was applied to one side of the separator and was dried while suspended upside down in a solvent vapor charged chamber until the acetone (solvent) was dissipated. See Table 3 for standard formulations.

The anode comprised 65 percent graphite (MCMB 2528 manufactured by Osaka Gas) in a slurry similar to the cathode, and was applied to the reverse side of the separator and dried in a similar manner. This unitary structure was then placed into an ether bath to remove the plasticizer followed by a vacuum drying process to remove residual ether.

Following drying, current collectors and appropriate foil leads were attached to the anode (copper) and cathode (aluminum). The finished unitary, bonded battery structure was then placed into a flexible aluminized plastic housing which was then sealed across the foil leads and both sides. This package was then placed into a moisture- and oxygen-free chamber where a predetermined quantity of electrolyte (1.2 ml to 1.4 ml) was dispensed into the package. The electrolyte composition was ethylene carbonate, dimethyl carbonate and 1 molar $LiPF_6$. The complete electrolyte may be purchased commercially. Following electrolyte dispensing, the open end of the package was sealed to prevent oxygen or moisture ingress and electrolyte loss. Following removal from the moisture-free and oxygen-free chamber, the battery was allowed to stand for 16 hours at ambient temperature and pressure for the electrolyte to absorb into the electrodes and separator.

The following tests were performed on this battery using an Arbin cycler. The battery was charged in a conditioning cycle at constant 11 milliampere current for up to 12 hours or until a voltage endpoint of 4.15 volts was attained. The 4.15 volt potential was held constant for an additional two hours. After a ten minute rest, the battery was discharged at 14 milliamperes down to 2.5 volts.

In the second, and subsequent cycles, current was applied at 14 milliamperes for up to 10 hours or until a voltage endpoint of 4.15 volts was attained. The 4.15 volt potential was again held constant for an additional two hours. After a ten minute rest, the battery was discharged at 14 milliamperes down to 2.5 volts.

Figure 2A:
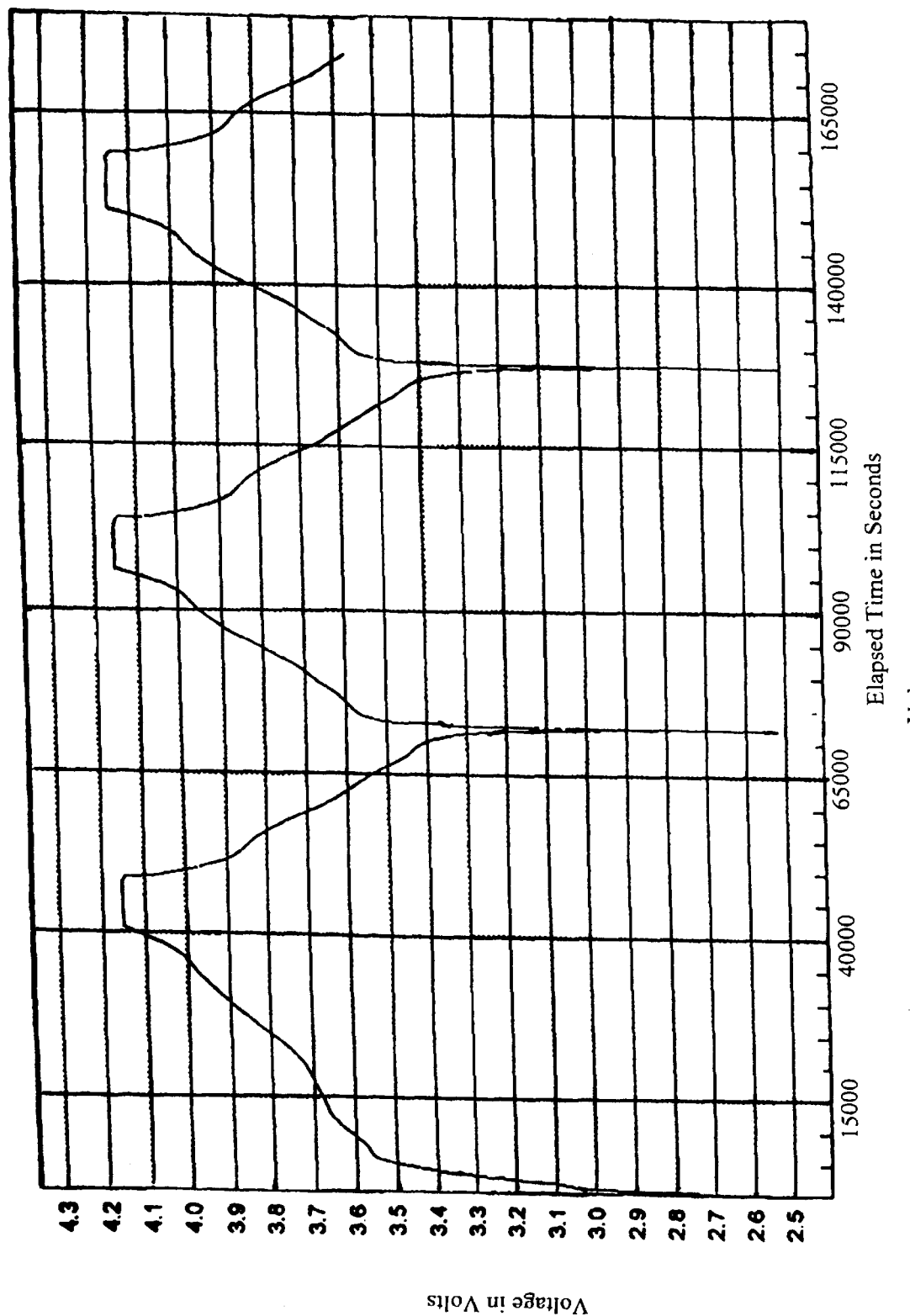
FIGS. 2a and 2b are rectilinear plots showing the charge and discharge voltage profiles of a typical secondary lithium ion battery (a) and the corresponding capacity curves (b).
Figure 2B:
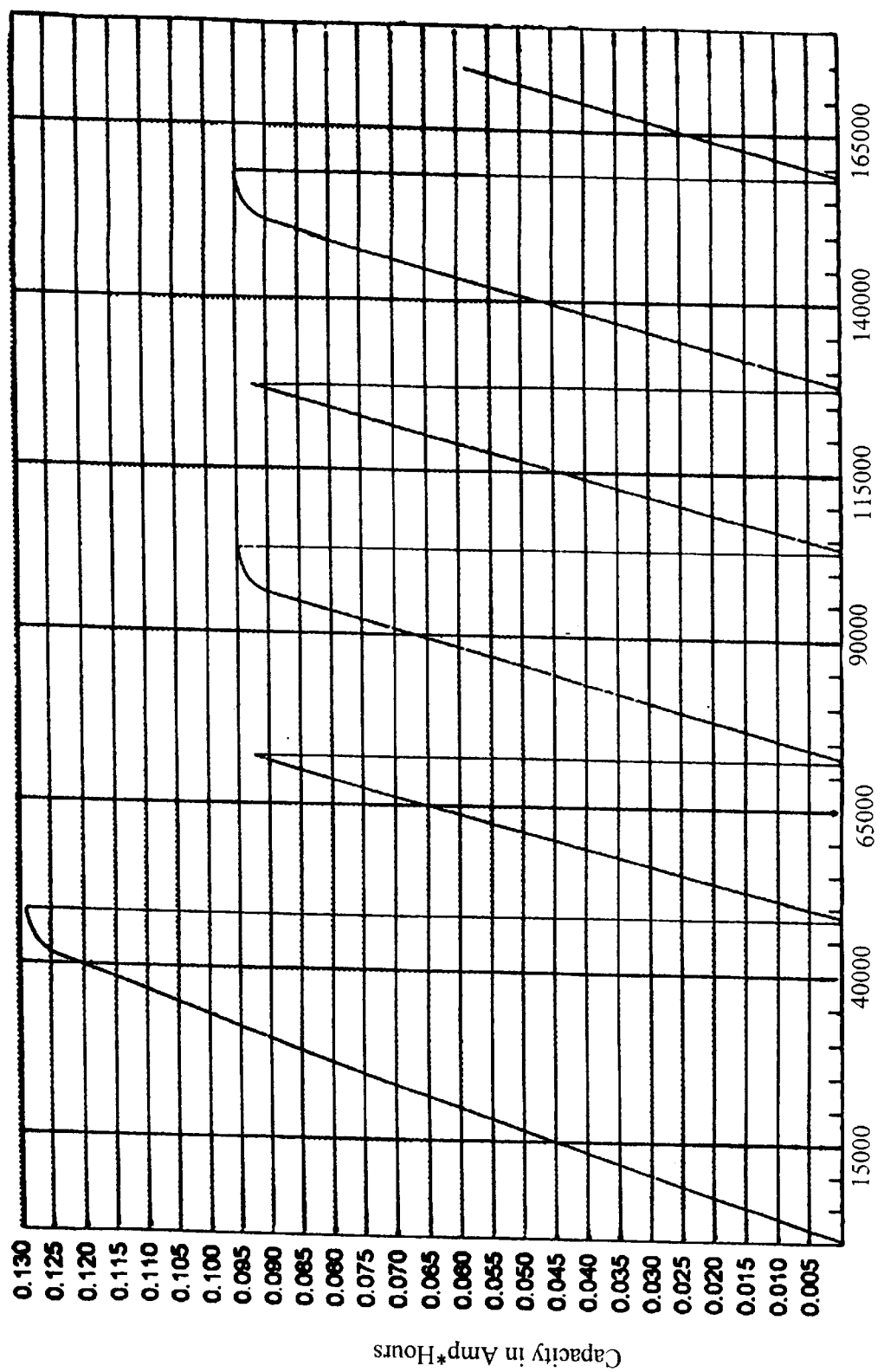
Figure 3B:
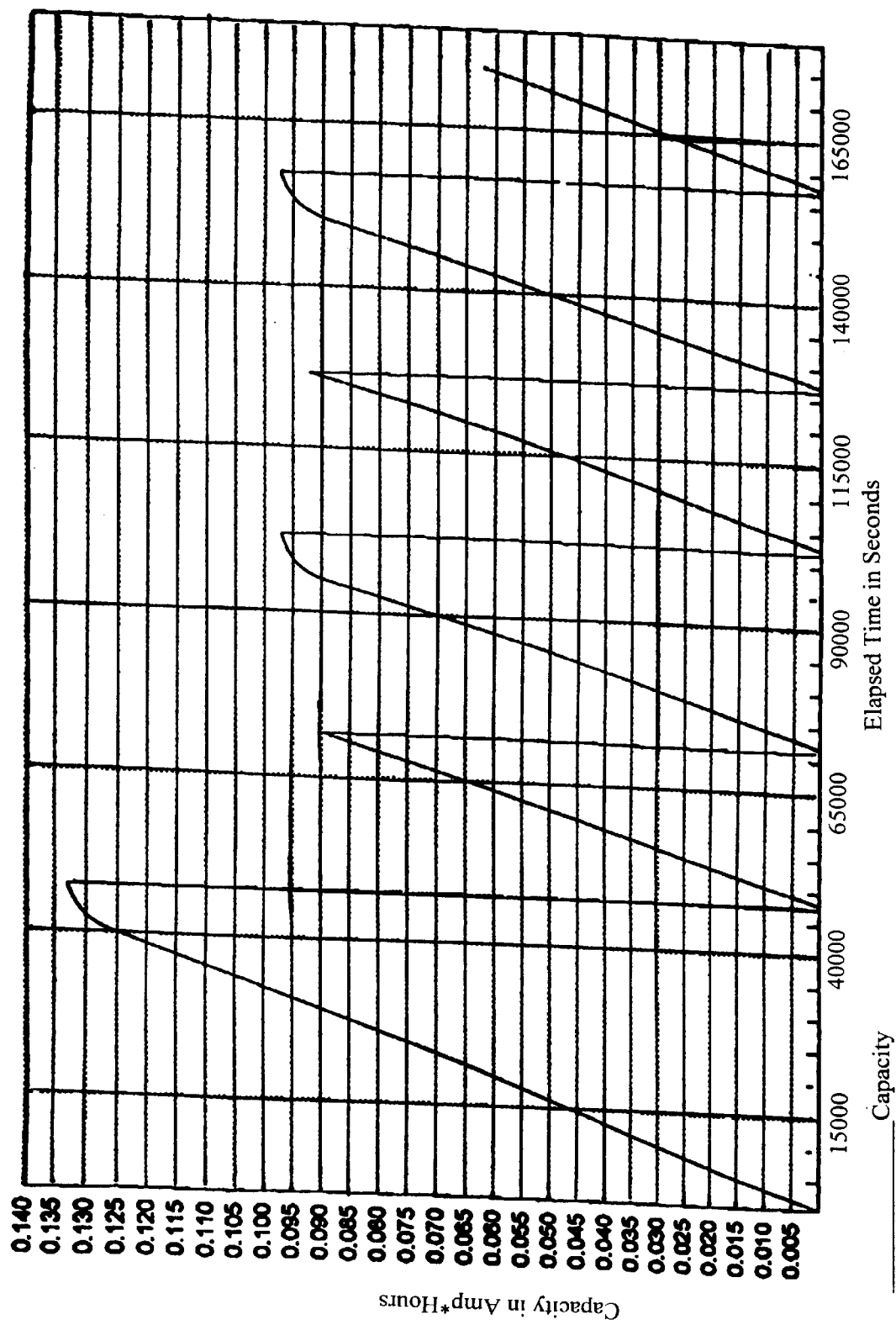
Figure 4A:
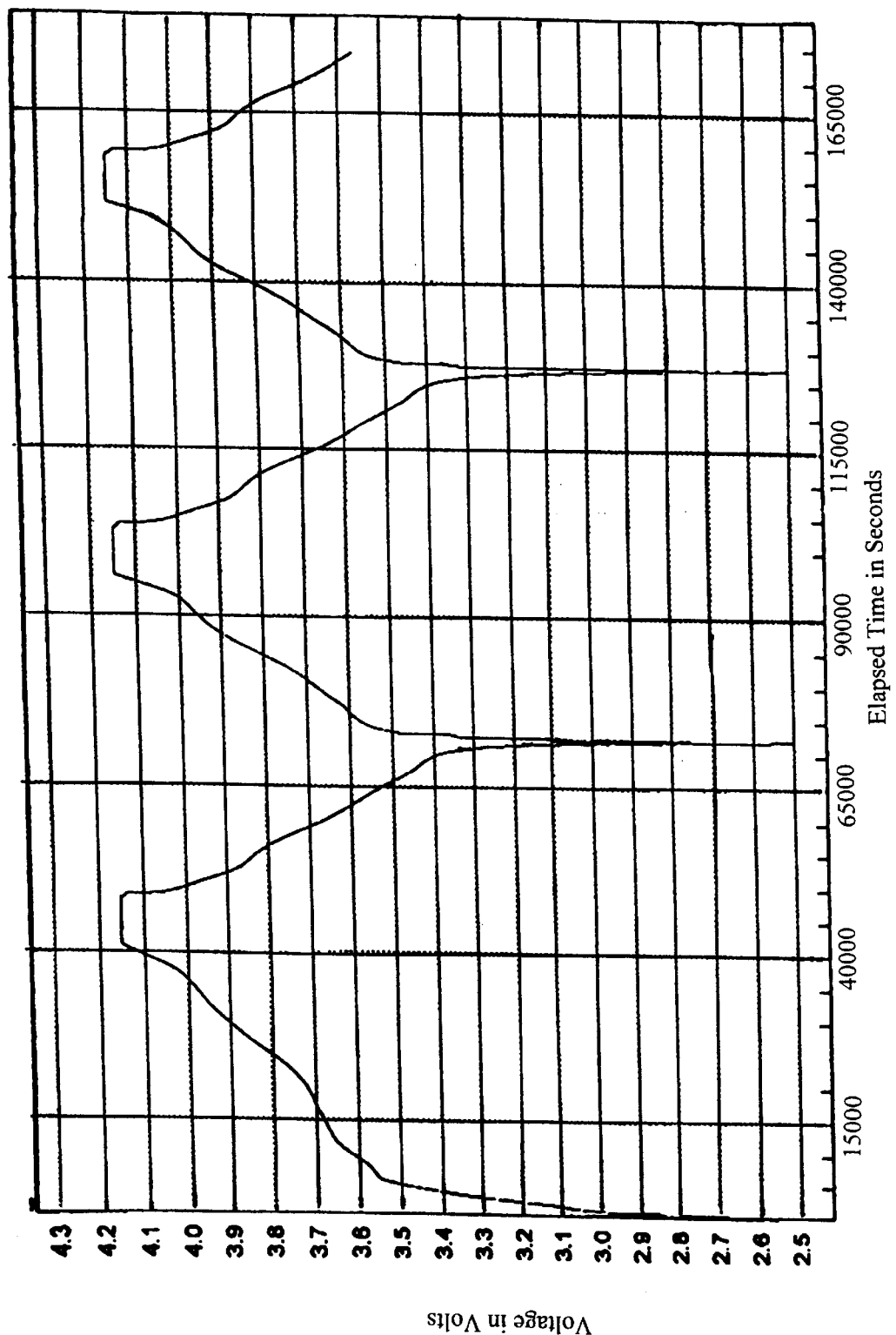
FIGS. 4a and 4b are rectilinear plots showing the charge and discharge voltage profiles of a third lithium ion battery (a) and the corresponding capacity curves (b).
Figure 4B:
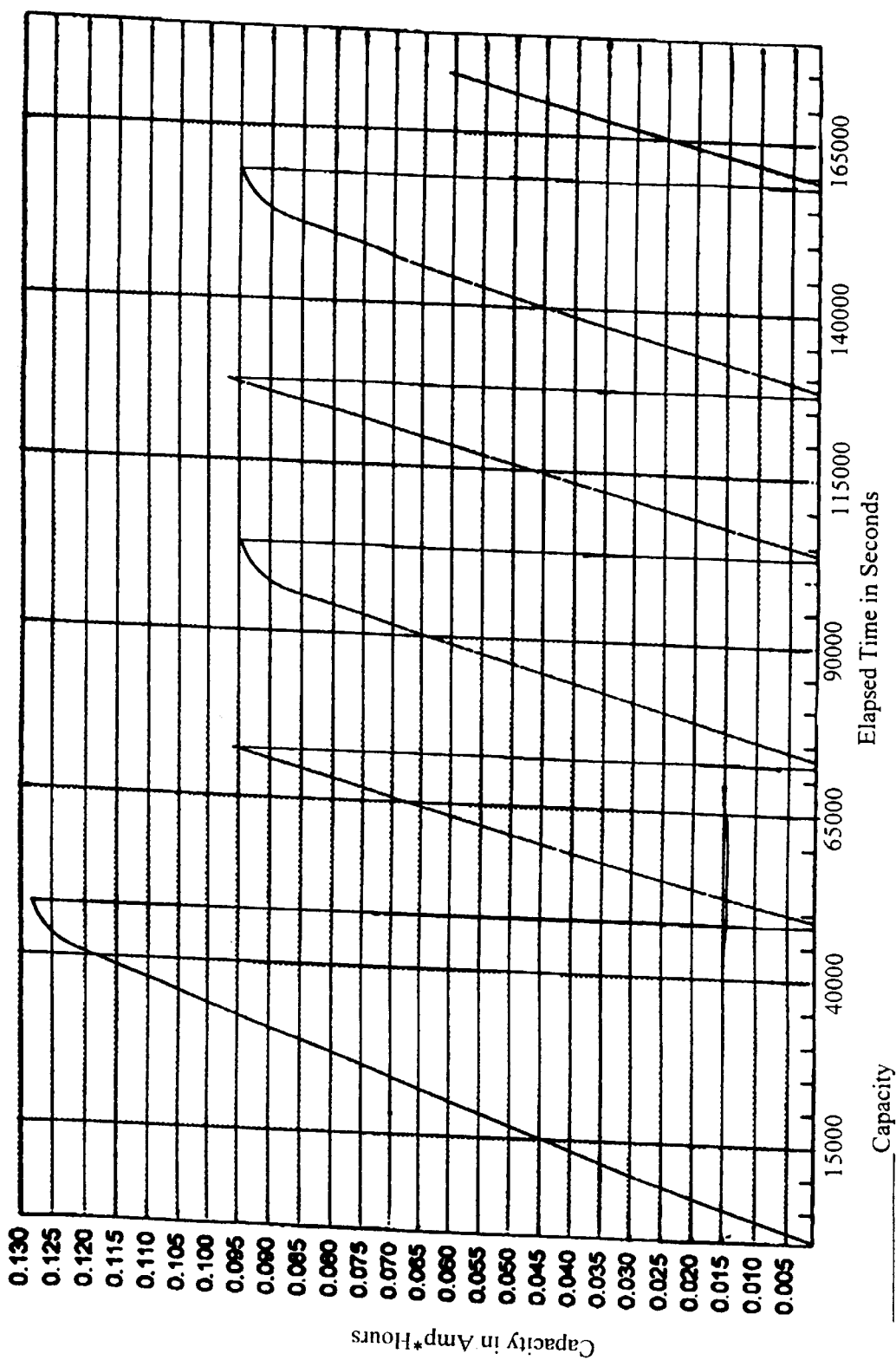
Figure 5:
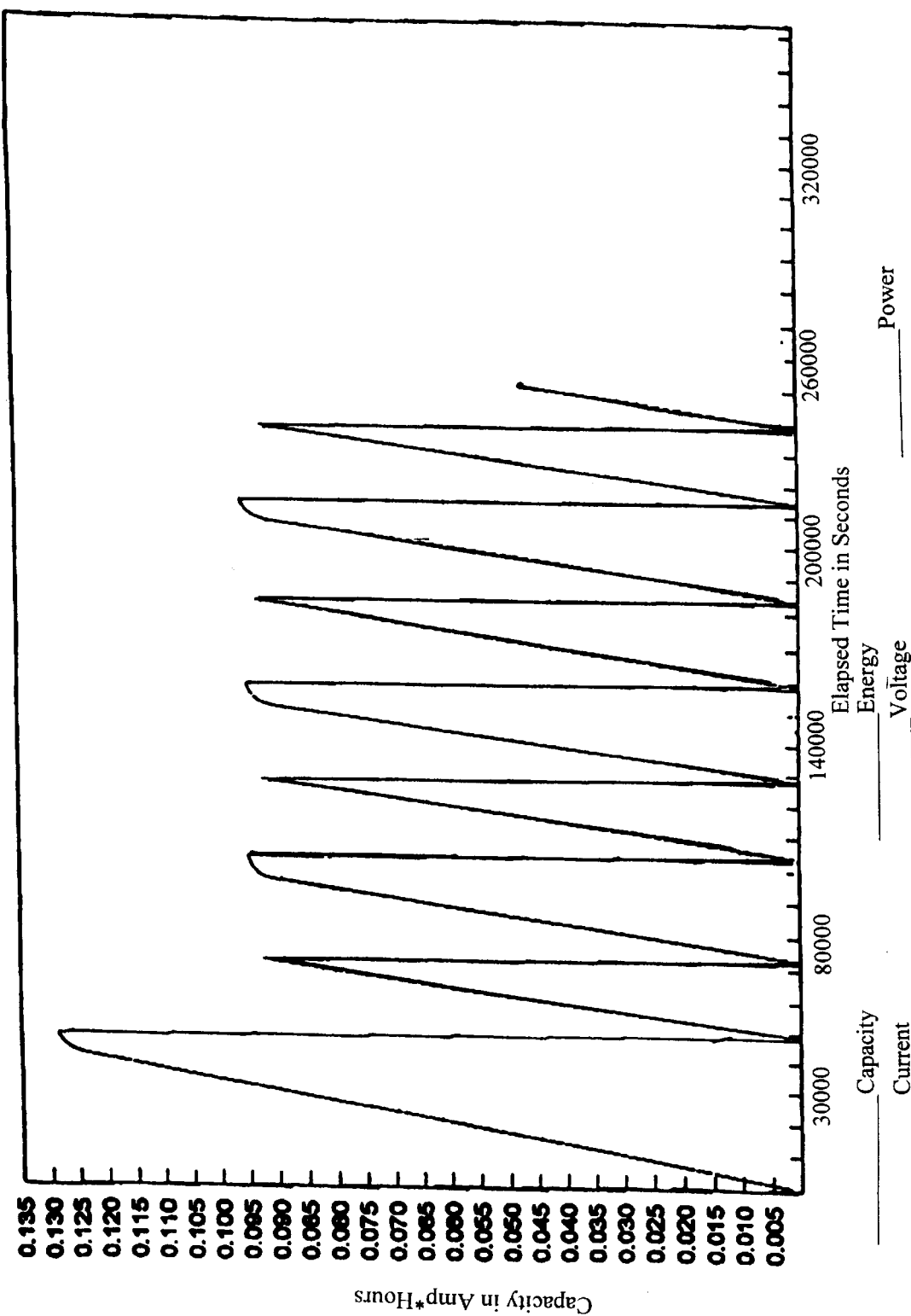
FIG. 5 is a capacity curve for the first of the secondary batteries (FIGS. 2a and 2b) showing capacity curves for further cycles.

The plots (FIGS. 2a, 3a, and 4a) show minimal voltage drop during the transition from charge to rest, indicating low internal resistance, which is attributable in large part to the excellent porosity of the separator. The flat slope of the charge curves indicates that the C/10 rate factor is in agreement with the expected capacity value. In the capacity curves (FIGS. 2b, 3b, and 4b) each of the batteries shows that when subjected to repeated cycles of charge/discharge, there is an initial 95 mA-hours in and 92 mA-hours out, with a subsequent charge/discharge efficiency reproducibly and repeatedly attaining 97 percent (compare sharp discharge spike height to rounded charge spike height). FIG. 5 shows that there is no deterioration of capacity upon further charge/discharge cycles.

EXAMPLE 2

Routine handling of the present separators, and subjecting them to unusual laboratory stress, indicated an unusually low failure rate which suggested that the matrix materials embedded in a solid, continuous plastic sheet imparted a strength not observed in separators of laminar construction. To test this hypothesis, separator sheets of the present invention were subjected to standard tests for tensile and tear strength. These tests are widely used in the paper industry to determine paper quality.

In the tear test, a stack of rectangles of material are held in the path of a pendulum. The pendulum strikes the sheets at a slit cut in the material, and tears through the sheets. The energy loss of the pendulum is the measure of tear resistance in the sample. This test will show how resistant the sample is to a tear force applied at a single point. This becomes an important manufacturing concern when the separator sheets are positioned for application of the electrode slurries. The tear tests were carried out using TAPPI Test Procedure T414 on an Elmendorf Tear Tester using a 1600 gram pendulum. The results of the tear and tensile tests are given in Table 1 and Table 2 respectively.

Table 1 gives the tear test results for base fabric (Sample 1), separator made by casting plastic without vacuum penetration (Sample 2), separator made according to the present vacuum process (Sample 3). The results indicate that the tear strength in grams of force is dramatically increased for sample 3. These results also indicate that there is a moderate increase in both machine direction (MD) tear and cross direction (CD) tear for a nonvacuum manufactured cast separator (2X compared to control) and a large increase in vacuum manufactured separators (4X compared to control), thus illustrating the significant increase in tear strength of the unitary sheet.

TABLE 1

| Sample ID | | Tear Scale Reading 32-ply MD | Tear Scale Reading 32-ply CD | Tear gf MD | Tear gf CD | Tear Index mN sq m/g MD | Tear Index CD |
| --- | --- | --- | --- | --- | --- | --- | --- |
| Sample 1 | Mean | 12.7 | 15.1 | 6.4 | 7.6 | 2.3 | 2.7 |
| | S.D. | 1.3 | 0.3 | | | | |
| | Max | 14.0 | 15.0 | | | | |
| | Min | 11.0 | 15.0 | | | | |
| Sample 2 | Mean | 24.0 | 31.7 | 12.0 | 15.9 | 2.4 | 3.2 |
| | S.D. | 0.7 | 3.3 | | | | |
| | Max | 25.0 | 37.0 | | | | |
| | Min | 23.0 | 27.0 | | | | |
| Sample 3 | Mean | 48.1 | 52.8 | 24.1 | 26.4 | 3.2 | 3.5 |
| | S.D. | 2.7 | 2.6 | | | | |
| | Max | 51.0 | 55.0 | | | | |
| | Min | 44.0 | 48.0 | | | | |

TABLE 2

| Sample ID | | Tensile lb/in | Stretch % | TEA J/Sq m | Tensile Index N-M/g |
| --- | --- | --- | --- | --- | --- |
| Sample 1 | Mean | 1.27 | 6.21 | 10.02 | 8.15 |
| | Min | 1.15 | 3.62 | 4.75 | 7.41 |
| | Max | 1.33 | 8.07 | 13.61 | 8.54 |
| | S.D. | 0.05 | 1.34 | 2.69 | 0.30 |
| Sample 2 | Mean | 1.66 | 67.39 | 145.67 | 5.97 |
| | Min | 1.15 | 46.76 | 92.24 | 5.36 |
| | Max | 1.33 | 81.98 | 13.61 | 6.56 |
| | S.D. | 0.05 | 10.67 | 30.18 | 0.36 |
| Sample 3 | Mean | 1.53 | 85.85 | 161.90 | 3.61 |
| | Min | 1.47 | 78.76 | 143.66 | 3.47 |
| | Max | 1.60 | 92.33 | 186.62 | 3.79 |
| | S.D. | 0.05 | 4.81 | 14.27 | 0.13 |

Table 2 shows the results for a tensile stretch test. In this test, material is pulled by its ends and the distance it stretches before breakage is measured. This test has predictive value for evaluating how well a material will tolerate tension as experienced during handling. The results indicate that the vacuum applied separators are superior to those passively cast on the fabric matrix. This means that rolls of separator can be stretched taut to ensure the proper registration of material during electrode coating. Also, since breakage is associated not with tension as an absolute value, but with a stretch difference, stretch tolerances can be used to QC the process controls, rather than guessing at pounds of tension associated with each step of the process. Tensile tests were conducted using TAPPI Test Procedure T494.

TABLE 3

| Material | Wt % | Wt-Acet | Wt % |
| --- | --- | --- | --- |
| | STD CATHODE | | |
| LiNiO2 | 31.80 | 146.50 | 66.38 |
| Carbon Black | 2.65 | 12.20 | 5.53 |
| KYNAR ® | 4.86 | 22.40 | 10.15 |
| DBA | 8.60 | 39.60 | 17.94 |
| Acetone | 52.09 | 0.00 | 0.00 |
| | 100.00 | 220.70 | 100.00 |
| | STD ANODE | | |
| MCMB | 35.85 | 179.65 | 66.77 |
| Carbon | 1.99 | 9.97 | 3.70 |

TABLE 3-continued

| Material | Wt % | Wt-Acet | Wt % |
|---|---|---|---|
| Black | | | |
| KYNAR ® | 5.48 | 27.44 | 10.19 |
| DBA | 10.40 | 52.10 | 19.36 |
| Acetone | 46.29 | 0.00 | 0.00 |
| | 100.00 | 269.16 | 100.00 |
| STD SEPARATOR | | | |
| KYNAR ® | 11.88 | 22.40 | 36.13 |
| DBA | 20.63 | 39.60 | 63.87 |
| Acetone | 67.50 | 0.00 | 0.00 |
| | 100.00 | 62.00 | 100.00 |

TABLE 4

| Variac | PSI | mm Hg |
|---|---|---|
| TABLE COVERED WITH PLASTIC SIMULATOR FILM | | |
| 100 | 1.48 | 77 |
| 90 | 1.26 | 65 |
| 80 | 1.08 | 56 |
| 70 | 0.89 | 46 |
| 60 | 0.71 | 37 |
| 50 | 0.56 | 29 |
| 40 | 0.42 | 22 |
| 30 | 0.28 | 14 |
| TABLE COVERED WITH UNCOATED WEB DYNAMICS PX0074 | | |
| 100 | 0.80 | 41 |
| 90 | 0.70 | 36 |
| 80 | 0.60 | 31 |
| 70 | 0.51 | 27 |
| 60 | 0.42 | 22 |
| 50 | 0.33 | 17 |
| 40 | 0.25 | 13 |
| 30 | 0.17 | 9 |

What is claimed is:

1. A battery comprising:

an ion permeable, porous sheet made of a polymeric material;

a fiber matrix separator core embedded within said porous sheet, said fiber matrix separator core defining a plurality of interstitial voids which are occupied by said polymeric material sheet;

a cathode fused with one side of said polymeric material sheet; and an anode fused with another, opposite side of said polymeric material sheet, whereby the fusion eliminates a line of demarcation between the separator and the cathode and between the separator and the anode so as to allow a low resistance, transition region between the cathode and separator and between the anode and separator.

2. A battery comprising:

a substantially flat fiber matrix separator core having a first surface and a second surface facing opposite the first surface, said matrix separator core having a thickness extending between the first and second surfaces, said matrix separator core defining a plurality of interstitial voids extending through the thickness of the matrix separator core, a cathode mounted adjacent said first surface of said fiber matrix separator core, an anode mounted adjacent said second surface of said fiber matrix separator core, a unitary, ion permeable, porous polymeric sheet having said matrix embedded therein, said polymeric sheet occupying the interstitial voids of the matrix core, and said polymeric sheet fused with said cathode and said anode to form a unitary structure with the separator, whereby the fusion eliminates a line of demarcation between the separator and the cathode and between the separator and the anode so as to allow a low resistance, transition region between the cathode and separator and between the anode and separator.

3. An electrochemical cell comprising a sheet of ion permeable polymeric material with a cathodic domain populated with cathodic material interspersed with said polymeric material, an anodic domain populated with anodic material interspersed with said polymeric material, and a separator core embedded within said polymeric material between said anodic domain and said cathodic domain.

4. A process for manufacturing a battery separator comprising the steps of:

coating a fibrous polymeric core matrix having two sides with one or more coatings of a polymer mixture containing a solvent plasticizer and a solvent vehicle to the first side;

applying a vacuum to the reverse side of said polymeric core matrix causing the polymer mixture to penetrate and infuse the capillary voids of the core matrix;

continuing said vacuum until said solvent vehicle is fully evaporated;

applying one or more second coating of polymer mixture to the second side of said matrix;

applying a vacuum to the reverse side thereof causing the polymer mixture to further penetrate and infuse the capillary voids of said matrix, and further causing the polymer boundaries penetrating from each said matrix side to merge; and continuing said vacuum until said solvent vehicle is fully evaporated.

5. The method of claim 4 wherein sufficient polymer mixture is applied to the two sides of said matrix to provide a layer of polymeric material overlying the first side of the matrix core and to further provide a layer of polymeric material overlying the second side of said matrix core.

* * * * *